(12) United States Patent
MacArthur et al.

(10) Patent No.: US 11,185,910 B2
(45) Date of Patent: Nov. 30, 2021

(54) COTTER PIN FORMING TOOL

(71) Applicant: Honda Motor Co., Ltd., Tokyo (JP)

(72) Inventors: Benjamin B. MacArthur, Barrie (CA);
Cameron Forward, Whitney (CA);
Benjamin Douglas Deboer, Ancaster (CA)

(73) Assignee: Hond Motor Co., Ltd., Tokyo (JP)

( * ) Notice: Subject to any disclaimer, the term of this patent is extended or adjusted under 35 U.S.C. 154(b) by 351 days.

(21) Appl. No.: 16/199,285

(22) Filed: Nov. 26, 2018

(65) Prior Publication Data
US 2020/0164423 A1 May 28, 2020

(51) Int. Cl.
*B21G 7/08* (2006.01)
*F16B 21/12* (2006.01)

(52) U.S. Cl.
CPC .............. *B21G 7/08* (2013.01); *F16B 21/12* (2013.01)

(58) Field of Classification Search
CPC ... B21G 7/00; B21G 7/08; F16B 21/12; F16B 2021/14; B25B 27/08; B23P 17/02; B23P 19/08; B23P 19/084; Y10T 29/16; Y10T 29/53809
USPC ........... 29/247, 249, 225, 243, 271; 411/364
See application file for complete search history.

(56) References Cited

U.S. PATENT DOCUMENTS

| 5,152,652 | A | 10/1992 | Nadherny |
| 9,724,809 | B2 | 8/2017 | Jones et al. |
| 10,183,387 | B2 * | 1/2019 | Griffin ................... B25B 27/08 |
| 2018/0169806 | A1 * | 6/2018 | Dorie ..................... B25B 27/20 |

FOREIGN PATENT DOCUMENTS

| CN | 203752084 U | 8/2014 |
| CN | 104924272 B | 12/2016 |
| CN | 107020596 A | 8/2017 |
| DE | 202014008807 U1 | 3/2015 |
| JP | H07124873 | * 5/1995 |
| JP | H07124873 A | 5/1995 |

* cited by examiner

*Primary Examiner* — Michael D Jennings
*Assistant Examiner* — Alberto Saenz
(74) *Attorney, Agent, or Firm* — American Honda Motor Co., Inc.; Morgan Lincoln

(57) ABSTRACT

A forming tool for a cotter pin is provided that includes a frame configured to mount to an electric tool, a pneumatic cylinder disposed on the frame, and a manipulator coupled to the pneumatic cylinder and configured to separate legs of the cotter pin. A system for forming a cotter pin is also provided that includes an electric tool having a rotatable head and a switch, and a forming tool coupled to the rotatable head that is configured to form legs of the cotter pin, and wherein the switch is configured to initiate an automatic forming sequence to form the legs. A method for forming a cotter pin is also provided that includes positioning a forming tool over a screw shaft through which a cotter pin is disposed, aligning the forming tool with legs of the cotter pin, and initiating an automatic forming sequence.

5 Claims, 17 Drawing Sheets

COTTER PIN FORMING TOOL

BACKGROUND

Vehicle components are often fastened together using a nut screwed onto a bolt or stud that has a screw shaft. In certain applications, additional components or materials may be used to prevent the nut from loosening. For example, the nut may be secured onto the screw shaft using an adhesive, such as a thread-locking compound for example, or a mechanical stop, such as a cotter pin.

The cotter pin, specifically, is inserted through a set hole that extends through a diameter of the screw shaft. It provides a physical barrier that prevents the nut from unscrewing on the screw shaft beyond the location of the cotter pin. However, forces or vibration acting on the fastener may also act on the cotter pin and cause it to slide out of the set hole unless it is also secured in position. In order to secure the cotter pin in the set hole, one or both legs of the cotter pin may be formed or bent after it is inserted through the set hole.

The cotter pin is often made of a soft metal material, which allows the use of manual hand tools, such as a screwdriver, hammer, or pliers, to form its legs. The use of the soft metal material also allows for relatively easy removal of the cotter pin if needed. Although this manual forming process may be effective in some applications, it is often slow and presents an opportunity for the process to be incorrectly performed or unintentionally bypassed. In a production environment where speed, consistency, and quality are important, there is a desire for an automated process to form the legs of the cotter pin in a fast, consistent, and verifiable manner.

BRIEF SUMMARY

According to one aspect, a forming tool for a cotter pin is provided. The forming tool includes a frame, a pneumatic cylinder, and a manipulator. The frame is configured to mount to an electric tool. The pneumatic cylinder is coupled to the frame and has a piston configured to move along a longitudinal axis that is parallel with two pre-formed legs of the cotter pin. The manipulator is coupled to the pneumatic cylinder and is configured to separate the legs.

According to another aspect, a system for forming a cotter pin is disposed. The system includes an electric tool and a forming tool. The electric tool includes a rotatable head and a switch. The forming tool is coupled to the rotatable head and is configured to form legs of the cotter pin. The switch is configured to initiate an automatic forming sequence to form the legs.

According to another aspect, a method for forming a cotter pin is provided. The method includes positioning a forming tool, aligning the forming tool, and initiating an automatic forming sequence. Positioning the forming tool includes positioning the forming tool over a screw shaft through which the cotter pin is disposed. Aligning the forming tool includes aligning the forming tool with legs of the cotter pin.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

With reference now to the figures wherein the illustrations are for purposes of illustrating one or more exemplary embodiments and not for purposes of limiting the same, there is shown a cotter pin forming tool.

Figure 1:
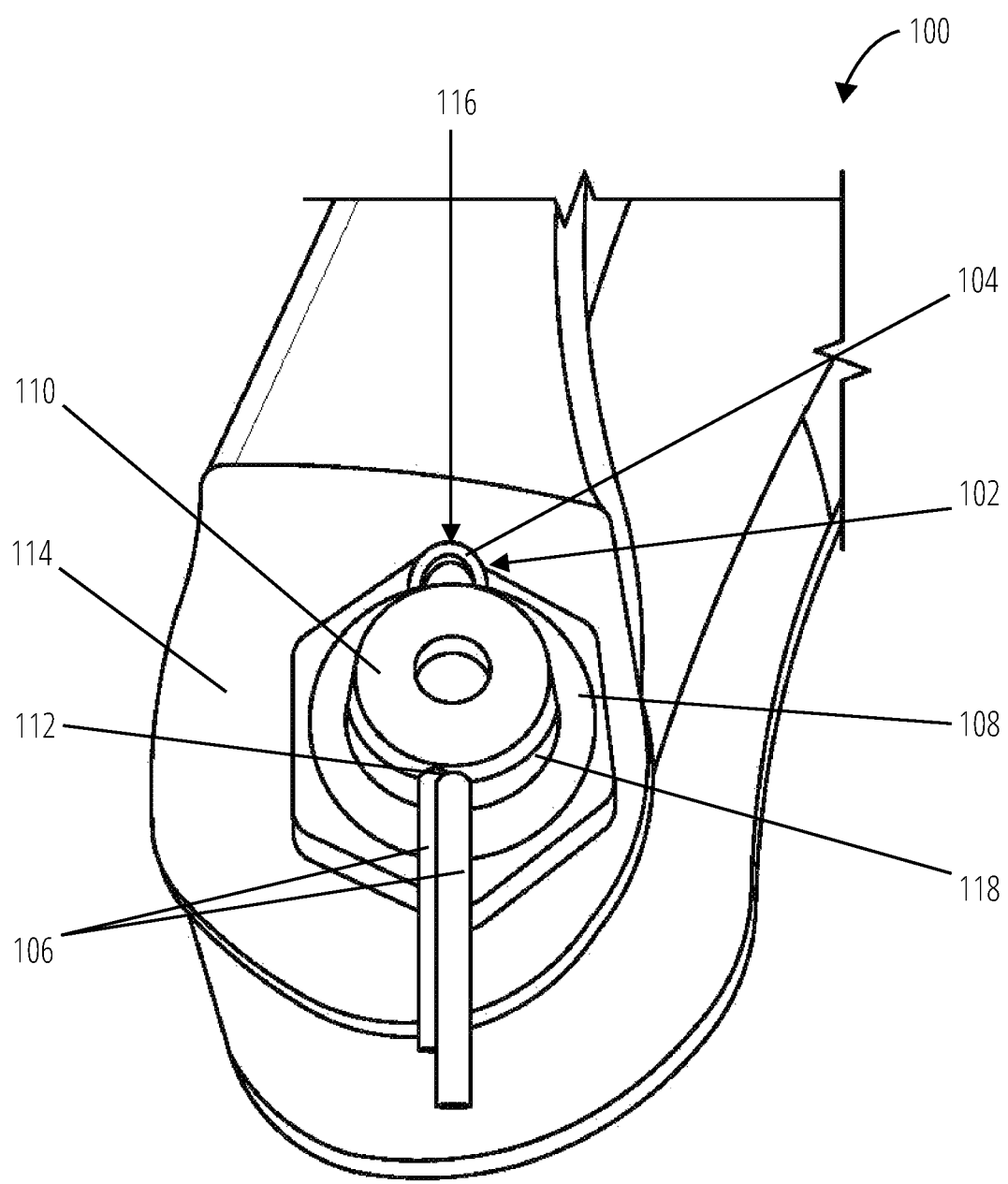
FIG. 1 is a perspective view of a screw shaft with a pre-formed cotter pin disposed therein according to an exemplary embodiment.

FIG. 1 is a perspective view of a screw shaft 110 and a cotter pin 102 in a pre-formed position 100 according to an exemplary embodiment. The screw shaft 110 includes threads 118 on an outer surface. The screw shaft 110 may be a portion of a bolt, machine screw, or stud, for example. A nut 108 comprising threads on an inner surface is removably coupled to the screw shaft 110. The nut 108 may be coupled to the screw shaft 110 against a vehicle component 114 to secure the vehicle component 114 to a vehicle. The screw shaft 110 includes a set hole 112 passing laterally through a diameter of the screw shaft 110. The set hole 112 is configured to receive two legs 106 of a cotter pin 102, as shown in the disclosed embodiment. Although illustrated in combination with the nut 108, the cotter pin 102 may also prevent an unthreaded shaft from being removed from an opening within vehicle component 114 without the aid of nut 108.

The cotter pin 102 includes a wire that is folded approximately in half and includes a ring shaped formation, hereinafter referred to as a head 104, at a vertex 116 of the fold. The head 104 is larger in size than the diameter of the set hole 112. The wire has a half-circular cross-section in the disclosed embodiment, providing a circular cross-section as the two legs 106 are disposed adjacent one another. The legs 106 may be equal in length, as shown in the disclosed embodiment, or may be unequal in length in other embodiments. The cotter pin 102 is typically formed from a soft metal material to provide for easy formability.

As shown in the disclosed embodiment, the legs 106 of the cotter pin 102 are inserted through the set hole 112. The head 104 contacts an outer surface of screw shaft 110 adjacent the set hole 112 and prevents the cotter pin 102, more specifically the head 104, from sliding through the set hole 112. The cotter pin 102, and more specifically each of the legs 106 of the cotter pin 102, is shown in the pre-formed position 100 in FIG. 1. In the pre-formed position 100, the legs 106 extend straight and are longitudinally aligned with the set hole 112. The position of the cotter pin 102 in the set hole 112 physically prevents the nut from uncoupling, or unscrewing, from the screw shaft 110 beyond the location of the set hole 112 and cotter pin 102.

Figure 2:
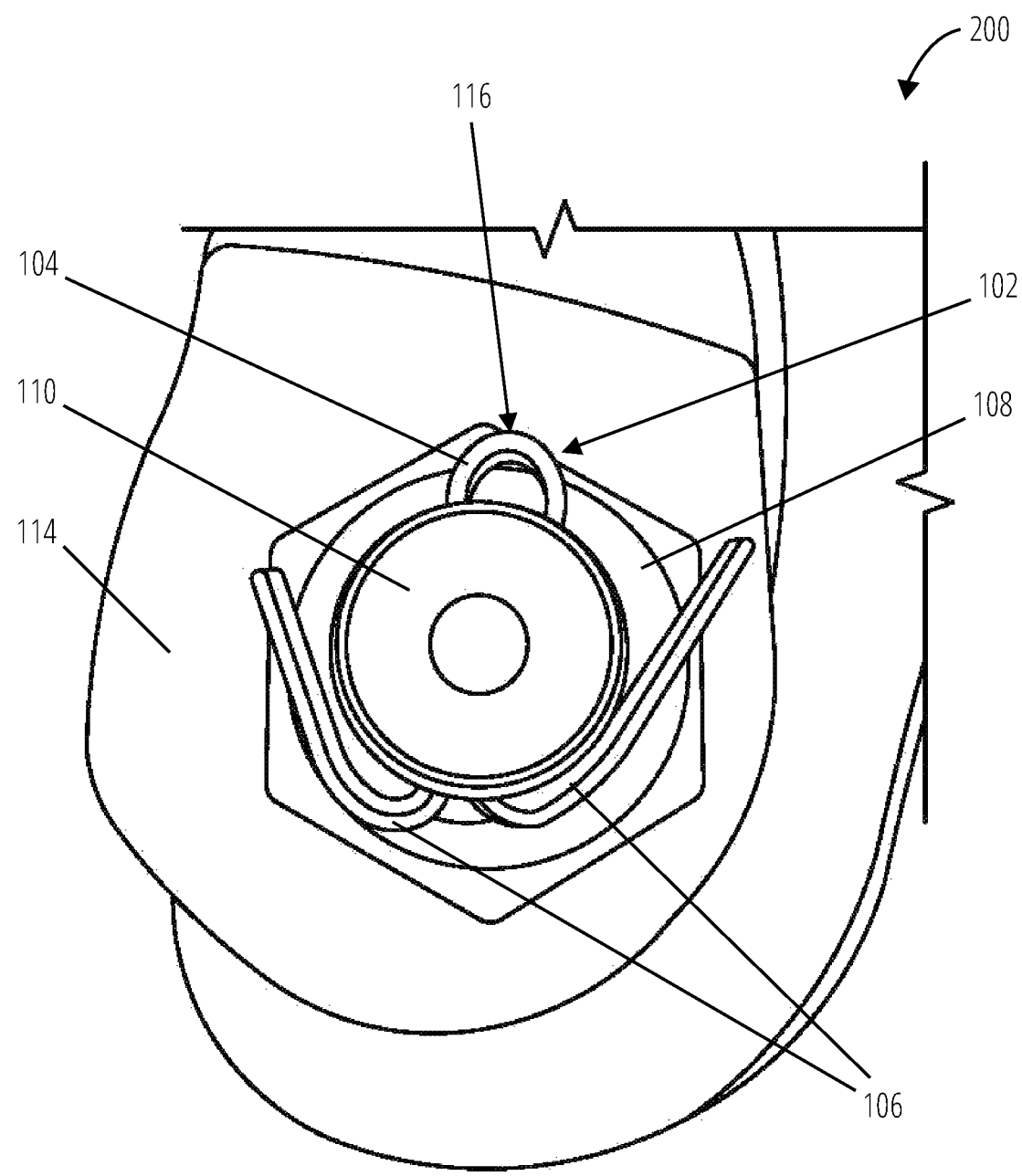
FIG. 2 is a perspective view of the screw shaft provided in FIG. 1 with a formed cotter pin disposed therein.

FIG. 2 is a perspective view of the screw shaft 110 and cotter pin 102 provided in FIG. 1 with the cotter pin 102 in a formed position 200. In the formed position 200, the legs 106 of the cotter pin 102 are formed, or folded, opposite one another and adjacent the screw shaft 110. The folded legs 106 physically prevent the cotter pin 102 from sliding out of the set hole 112. The soft metal material of the cotter pin 102 allows for the legs 106 to be unfolded to the pre-formed position 100 to allow for removal of the cotter pin 102 from the set hole 112 if needed, but only with application of a deliberate removal force.

Figure 3:
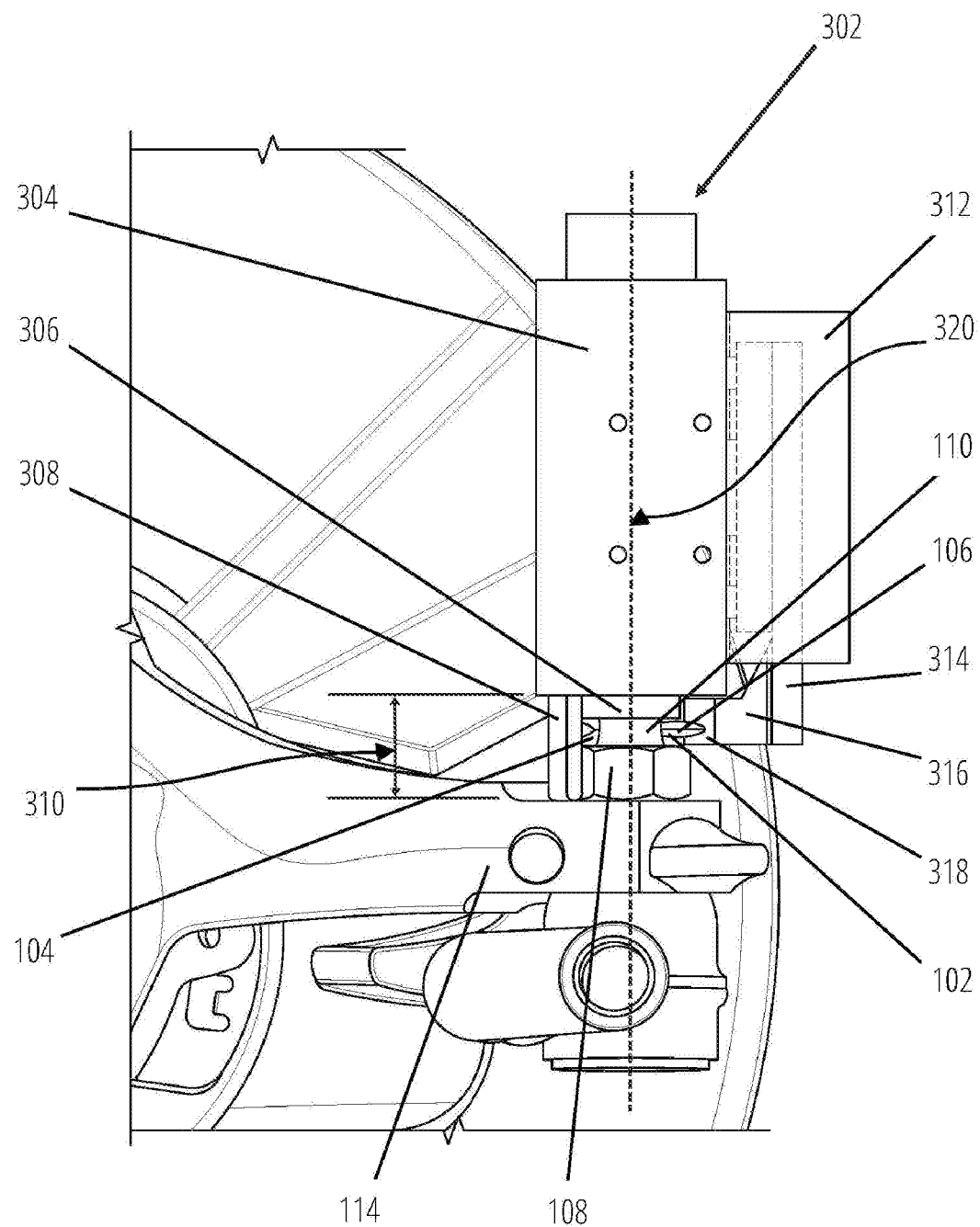
FIG. 3 is a side view of a forming tool according to an exemplary embodiment positioned over a cotter pin in an exemplary environment.

FIG. 3 is a side view of a forming tool 302, according to an exemplary embodiment, positioned over a cotter pin 102 and a screw shaft 110 in an exemplary environment. Some examples of this environment may be a vehicle suspension system or a vehicle drivetrain. The forming tool 302 includes a frame 304, a manipulator 314, a pneumatic cylinder (shown in FIG. 4), and a guard 312. The pneumatic cylinder 402 is coupled to the frame 304, and the manipulator 314 and the guard 312 are each coupled to the pneumatic cylinder 402.

The frame 304, includes a wall portion 308 that contacts the vehicle component 114 and defines a stand-off distance 310 of a locating ring 306 from the vehicle component 114. The locating ring 306 is positioned over the screw shaft 110 to radially align the forming tool 302 with the screw shaft 110.

The manipulator 314 includes a blade portion 316 and a tip 318. The blade portion 316 is configured to separate the legs 106 of the cotter pin 102. The tip 318 is disposed on the blade portion 316 and is configured to form each of the legs 106 as the forming tool 302 is rotated around an axis 320.

In the exemplary embodiment, the forming tool 302, and more specifically the locating ring 306, is positioned over the screw shaft 110. The manipulator 314 is longitudinally aligned with the legs 106 of the cotter pin 102, and the wall portion 308 is adjacent the head 104 of the cotter pin 102. Additionally, the pneumatic cylinder is in a closed position (described with respect to FIG. 6) in FIG. 3, wherein the manipulator 314 is adjacent a body of the pneumatic cylinder.

Figure 4:
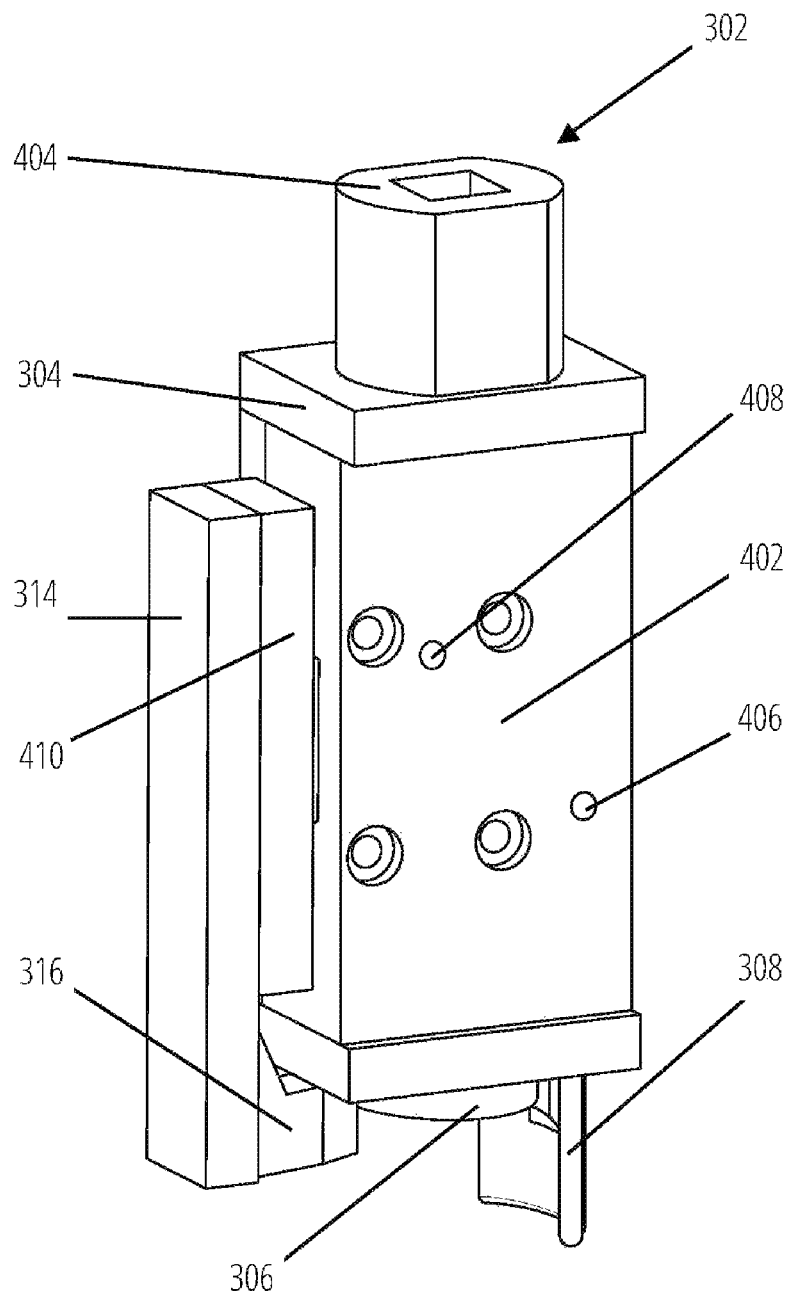
FIG. 4 is a perspective view of the forming tool provided in FIG. 3.

FIG. 4 is a perspective view of the forming tool 302 provided in FIG. 3 with the guard 312 removed. As previously described, the pneumatic cylinder 402 is coupled to the frame 304, and the manipulator 314 is coupled to the pneumatic cylinder 402. More specifically, the manipulator 314 is coupled to a mounting plate 410 that is coupled to an extendable piston 702 (shown in FIG. 7) of the pneumatic cylinder 402.

The pneumatic cylinder 402 is a double-acting pneumatic cylinder in the disclosed embodiment. A double-acting pneumatic cylinder has two air ports, an outstroke port 406 and an instroke port 408, configured to use forced air to either extend or retract the extendable piston 702 dependent on which of the ports the forced air is directed. An air line having a controllable air flow is coupled to each of the outstroke port 406 and the instroke port 408. Air flow entering the outstroke port 406 will extend the piston 702, and thus the manipulator 314 away from the pneumatic cylinder 402; and air flow entering the instroke port 408 with retract the piston 702, and thus the manipulator 314 toward the pneumatic cylinder 402.

Figure 8:
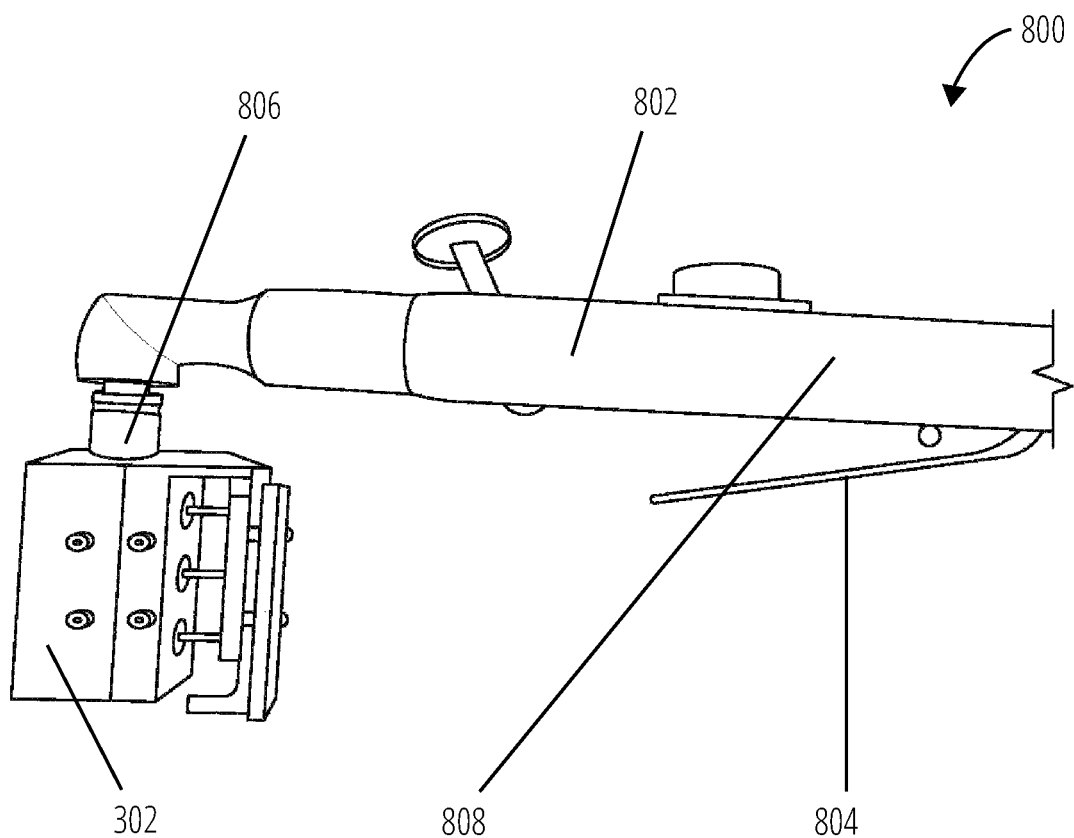
FIG. 8 is a perspective view of a system for forming a cotter pin according to an exemplary embodiment.

The forming tool 302 includes a coupling interface 404 wherein the forming tool 302 couples to an electric tool 802 (shown in FIG. 8). More specifically, the coupling interface 404 is configured to couple to a rotatable head of the electric tool 802.

Figure 5:
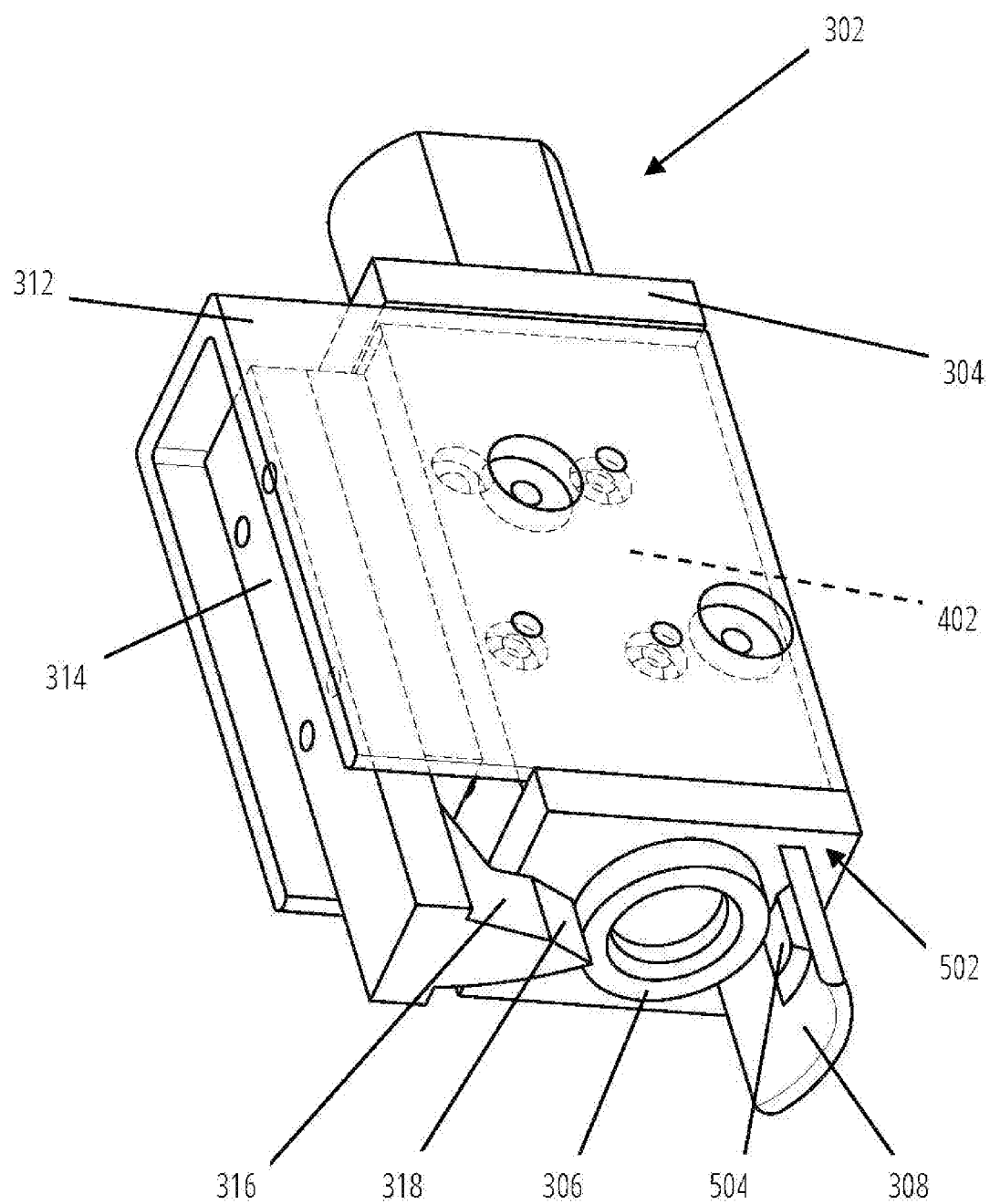
FIG. 5 is a perspective view of the forming tool provided in FIG. 3.

FIG. 5 is another perspective view of the forming tool 302 shown in FIG. 3. In FIG. 5 the guard 312 remains coupled to the pneumatic cylinder 402. The locating ring 306 extends from a bottom surface 502 of the forming tool 302 and includes a circular projection. The wall portion 308 also extends from the bottom surface 502 and includes a semi-circular projection that extends beyond the height of the locating ring 306. The wall portion 308 also includes a stop projection 504 that extends from the wall portion 308 towards the locating ring 306. During use of the forming tool 302, the stop projection 504 abuts the head 104 of the cotter pin 102 and prevents the cotter pin 102 from sliding within the set hole 112 away from the manipulator 314 as force is applied to the legs 106.

Figure 6:
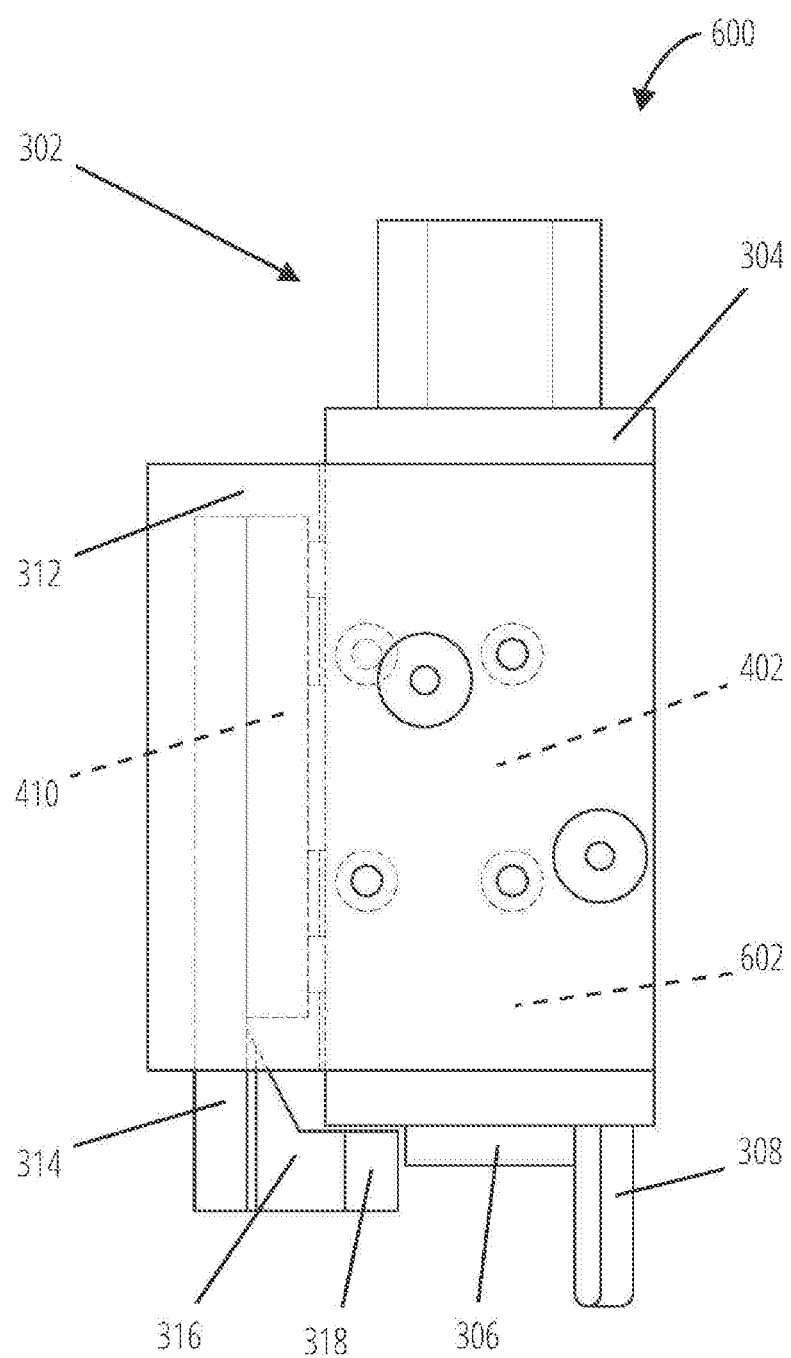
FIG. 6 is a side view of the forming tool provided in FIG. 3 wherein a manipulator is in a closed position.

FIG. 6 is a side view of the forming tool 302 provided in FIG. 3 with the manipulator 314 in a closed position 600. In the closed position 600 the manipulator 314 abuts the pneumatic cylinder 402. More specifically, the manipulator 314 is coupled to the mounting plate 410 that abuts a body 602 of the pneumatic cylinder 402. Further, in the closed position 600 the blade portion 316 of the manipulator 314 is between the legs 106 of the cotter pin 102 when the forming tool 302 is positioned over the cotter pin 102 and screw shaft 110 as provided in FIG. 3.

Figure 7:
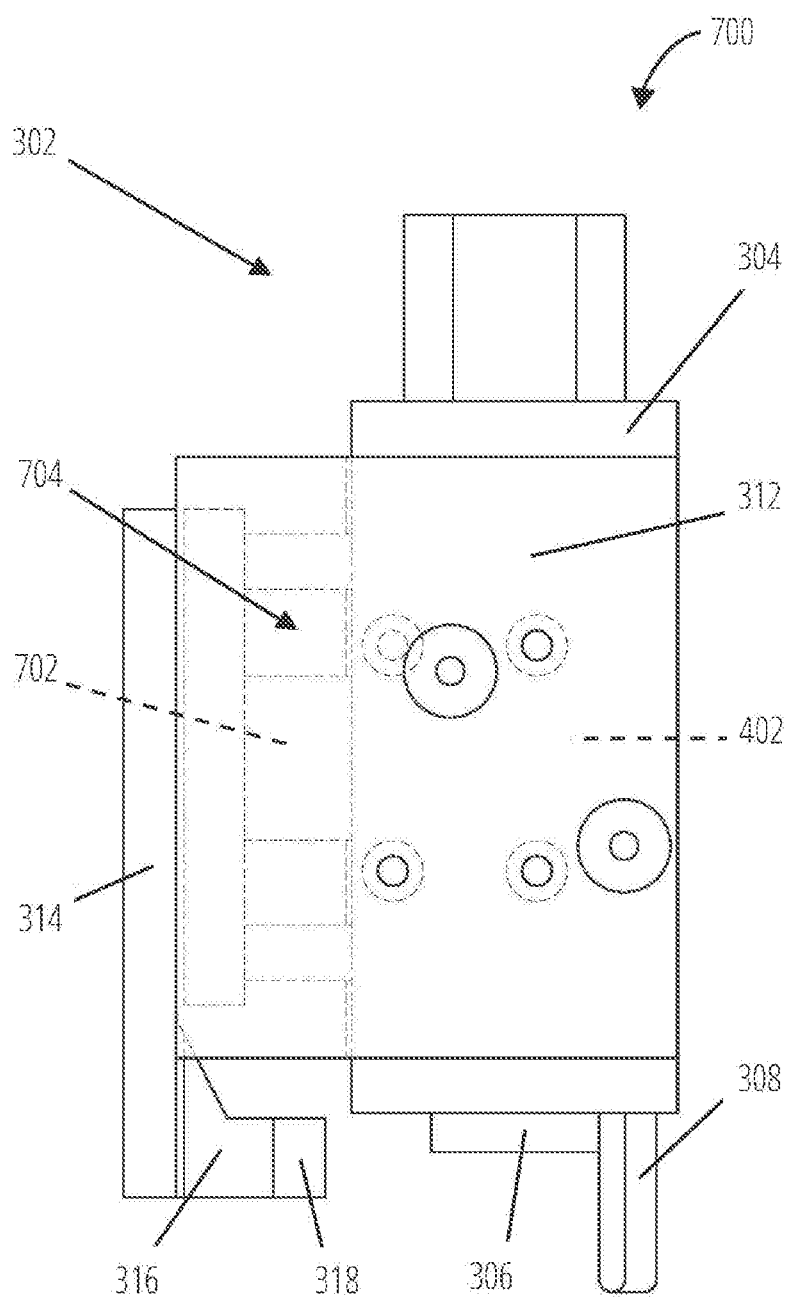
FIG. 7 is a side view of the forming tool provided in FIG. 3 wherein the manipulator is in an open position.

FIG. 7 is a side view of the forming tool 302 shown in FIG. 3 with the manipulator 314 in an open position 700. In the open position 700 the manipulator 314 is disposed away from the body 602 via an extendable piston 702 of the pneumatic cylinder 402. More specifically, the mounting plate 410, to which the manipulator 314 is coupled, is coupled to an end of the extendable piston 702 that is extended away from the body 602. The extendable piston 702 is a part of the pneumatic cylinder 402 that is configured to extend and retract with respect to the body 602 as forced air is directed to either the outstroke port 406 or the instroke port 408. The guard 312 is configured to cover a gap 704 (i.e., a potential pinch-point during use) between the manipulator 314 and the pneumatic cylinder 402 when the forming tool 302 is in the open position 700. Further, in the open position 700 the manipulator 314 is spaced away from and disengaged from the legs 106.

FIG. 8 is a perspective view of a system 800 for forming the cotter pin 102 according to an exemplary embodiment.

The system 800 includes an electric tool 802 and a forming tool, for example, forming tool 302 (shown in FIG. 3). The electric tool 802 includes a switch 804, a rotatable head 806, and a handle 808. The electric tool 802 is a direct current (DC) electric tool in the disclosed embodiment, however in other embodiments the electric tool may be any other type of electric tool comprising a rotatable head and configurable to couple to a forming tool and measure a rotational force.

In an exemplary embodiment, the switch 804 may be communicatively coupled to a controller that is coupled to air valves that are, in turn, coupled to the outstroke port 406 and the instroke port 408 of the forming tool 302. The switch 804 is configured to initiate a forming sequence in the controller, such as method 1100 (shown in FIG. 11), that instructs the air valves to selectively open and close. In a further embodiment, the switch 804 may not be communicatively coupled to the controller, and the air valves may be controlled independently of the switch 804 by a second switch. The second switch may include two positions wherein forced air is directed to the instroke port 408 to retract the piston 702 when the second switch is in a first position, and directed to the outstroke port 406 to extend the piston 702 when the second switch is in a second position.

The switch 804 is a paddle-type switch in the disclosed embodiment, however the switch may include a push-button or any other type of mechanical switch in other embodiments. The switch 804 is configured to be engaged by the manufacturing associate to initiate the forming sequence for forming the cotter pin 102.

The rotatable head 806 couples the electric tool 802 to the forming tool 302. More specifically, the rotatable head 806 of the electric tool 802 couples to the coupling interface 404 of the forming tool 302. The handle 808 is held by a manufacturing associate that is operating the electric tool 802. The rotatable head 806 rotates with respect to the handle 808, causing the forming tool 302 to also rotate with respect to the handle 808. As a result, the system 800 is configured to allow the manufacturing associate to hold the electric tool 802, specifically the handle 808, in a static position as the forming tool 302 rotates around the axis 320.

Figure 9:
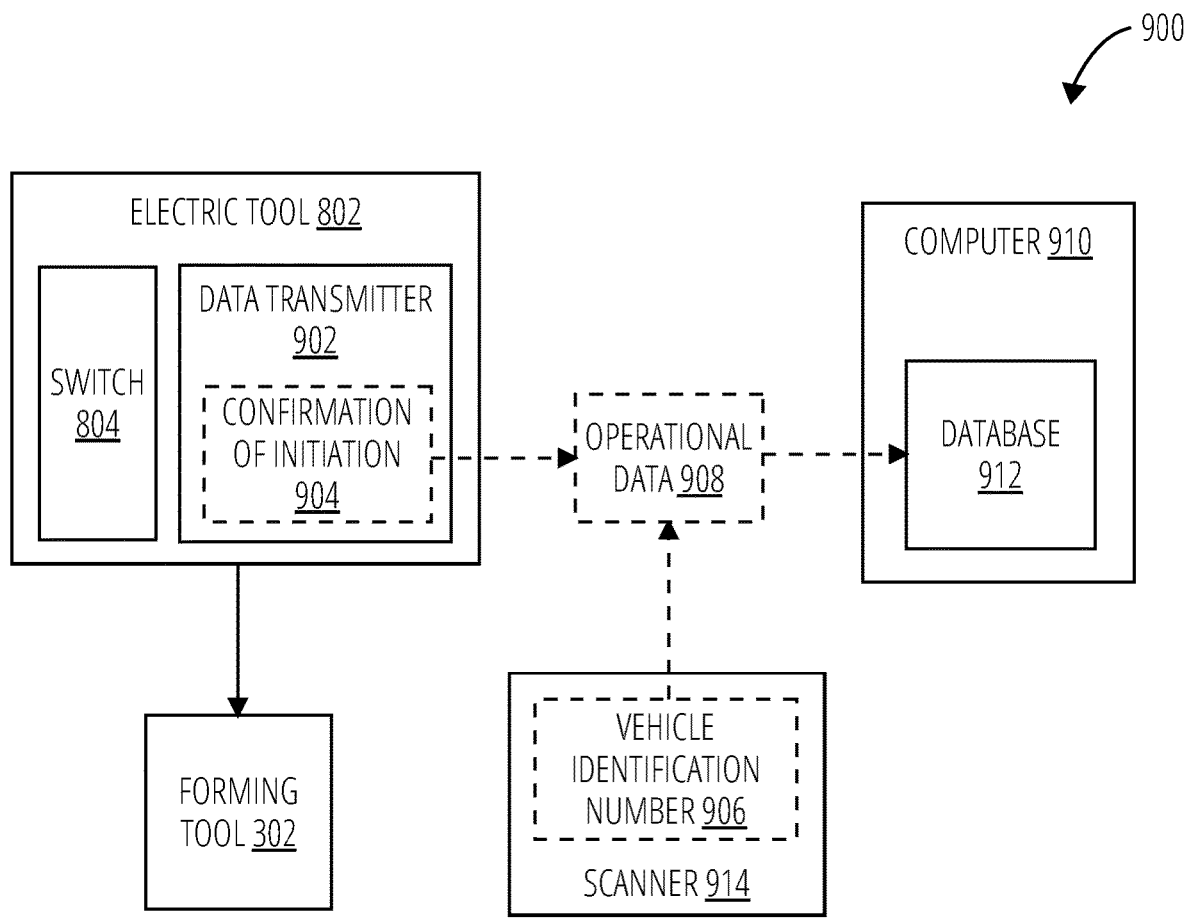
FIG. 9 is a schematic view of a system for forming a cotter pin according to an exemplary embodiment.

FIG. 9 is a schematic view of a system 900 for forming the cotter pin 102 according to a further embodiment. The system 900 includes the forming tool 302, the electric tool 802, and a computer 910 coupled to or including a database 912. The electric tool 802 in system 900 further includes a data transmitter 902. The data transmitter 902 is configured to transmit data, for example, via a physical wire, or wirelessly, such as using Wi-Fi or Bluetooth technologies for example. When the manufacturing associate engages the switch 804, the electric tool 802 begins the forming sequence and generates a signal indicating confirmation of initiation 904. The confirmation of initiation 904 is transmitted from the electric tool 802 to the computer 910. More specifically, the signal is transmitted by the data transmitter 902 of the electric tool 802 to the database 912 of the computer 910.

The computer 910 is configured to receive the confirmation of initiation 904 and an associated vehicle identification number 906, together known as the operational data 908, and to store the operational data 908 in the database 912. The vehicle identification number 906 is read and input via a scanner 914 in the disclosed embodiment, however in other embodiments the vehicle identification number 906 may be input using a keyboard or other data entry device. The scanner 914 may be, for example, a handheld scanner configured to read a bar code, or a radio-frequency identification (RFID) scanner configured to read an RFID tag positioned on or near a vehicle. The vehicle identification number 906 is associated with the confirmation of initiation 904 in the database 912 to provide verification that the cotter pin 102 on a specific vehicle has been formed; more specifically, that a manufacturing associate has initiated the forming sequence with respect to a specific vehicle identification number 906.

Figure 10:
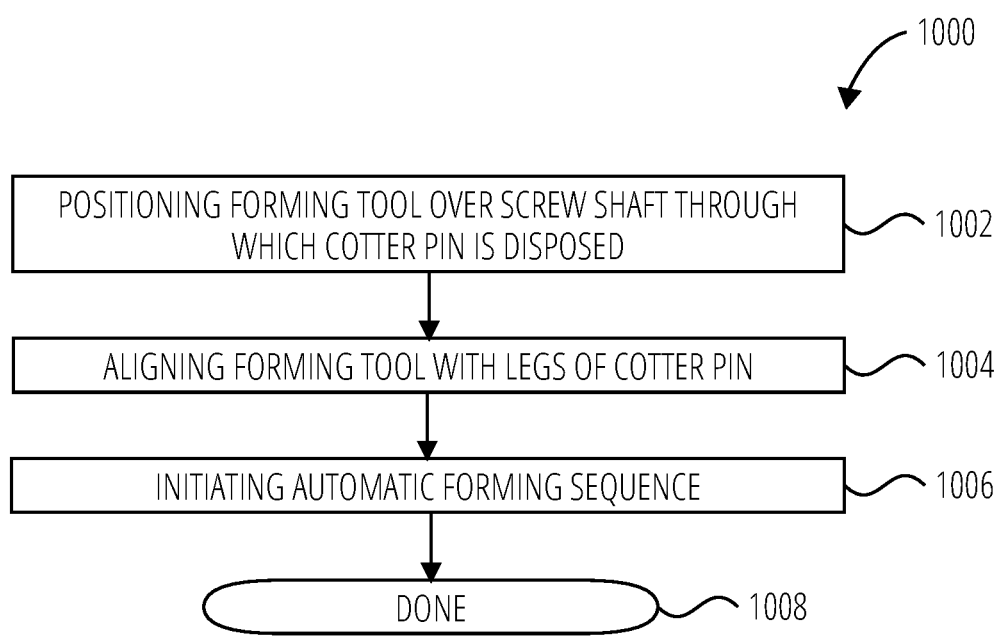
FIG. 10 is a method for forming a cotter pin according to an exemplary embodiment.

FIG. 10 is a method 1000 for forming a cotter pin with a forming tool according to an exemplary embodiment. The cotter pin may include the embodiment described in FIG. 1, and the forming tool may include the embodiment provided in FIG. 3, for example, and described as forming tool 302. Method 1000 includes positioning 1002 the forming tool 302 over a screw shaft through which the cotter pin 102 is disposed, aligning 1004 the forming tool 302 with legs 106 of the cotter pin 102, and initiating 1006 an automatic forming sequence, as will be described further with respect to FIG. 11.

Positioning 1002 the forming tool 302 over the screw shaft 110 includes placing a bottom surface 502 of the frame 304 adjacent an end of the screw shaft 110. In an exemplary embodiment, positioning 1002 the forming tool 302 includes radially aligning the locating ring 306 projecting from the bottom surface 502 over the end of the screw shaft 110.

Aligning 1004 the forming tool 302 with legs 106 of the cotter pin 102 includes longitudinally aligning the manipulator 314 with the cotter pin 102, and more specifically, aligning the tip 318 of the manipulator 314 with the space between the legs 106 of the cotter pin 102. In an exemplary embodiment, aligning 1004 the forming tool 302 includes rotating the forming tool 302 about the axis 320 of the screw shaft 110 to longitudinally align the manipulator 314 with the legs 106.

Initiating 1006 the automatic forming sequence includes triggering or engaging an automatic process that forms the legs 106. In an exemplary embodiment, initiating 1006 the forming sequence includes engaging a switch of an electric tool. The electric tool may include the embodiment provided in system 800 and shown in FIG. 8.

In an exemplary embodiment, method 1000 further includes receiving a VIN and automatically storing operational data in a database after initiating 1006 the forming sequence. The operational data includes a vehicle identification number and a corresponding confirmation of initiation of the forming sequence with respect to the specific vehicle identification number. The database may include the embodiment provided in system 900 and shown in FIG. 9.

Figure 11:
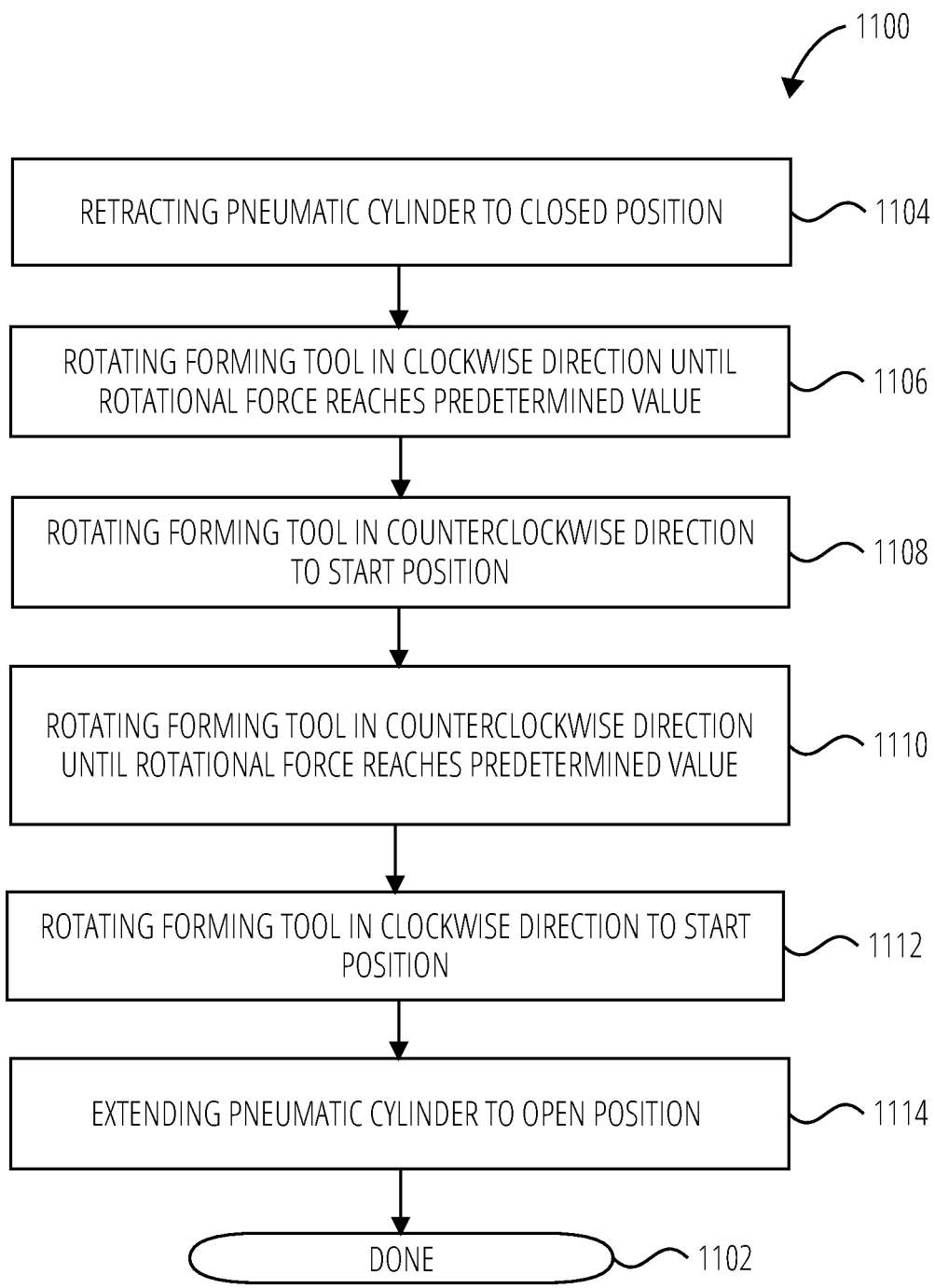
FIG. 11 is a method initiated by the method provided in FIG. 10 according to an exemplary embodiment.

FIG. 11 is an exemplary embodiment of a method 1100, previously referred to as the forming sequence, initiated by method 1000 as provided in FIG. 10. Method 1100 includes a number of steps performed by the forming tool 302 to form the legs 106 of the cotter pin 102. In the exemplary embodiment, method 1100 includes retracting 1104 the pneumatic cylinder to the closed position 600 to cause the manipulator 314 to separate the legs 106; rotating 1106 the forming tool 302 in a clockwise direction until a rotational force reaches a predetermined value; rotating 1108 the forming tool 302 in a counter clockwise direction until the manipulator 314 reaches a start position wherein the forming tool 302 is aligned with the pre-formed position 100 of the legs 106; rotating 1110 the forming tool 302 in a counter clockwise direction until the rotational force reaches the predetermined value; rotating 1112 the forming tool 302 in the clockwise direction until the manipulator 314 reaches the start position; and extending 1114 the pneumatic cylinder 402 to the open position 700 wherein the manipulator 314 moves away from the cotter pin 102. The rotation of the forming tool 302 and measurement of the rotational force is performed by the electric tool 802 that is coupled to the frame 304 of the forming tool 302. More specifically, the rotatable head 806 rotates in the indicated directions as a manufacturing associate holds the handle 808 of the electric tool 802 in a static position.

In a further embodiment, retracting 1104 and extending 1114 the pneumatic cylinder may not be initiated by the switch 804 of the electric tool 802, but instead by a second switch, for example the second switch described with respect to FIG. 8. More specifically, the second switch is moved by the manufacturing associate to a first position to retract 1104 the pneumatic cylinder, the switch 804 of the electric tool 802 is engaged to initiate steps 1106 through 1112 of method 1100, and then the second switch is moved to a second position to extend 1114 the pneumatic cylinder.

The predetermined value of the rotational force is dependent on the geometry and material comprising the cotter pin 102. In an exemplary embodiment the predetermined value may be 3 NM, however it may vary from 1 NM to 5 NM, for example, in other embodiments. To be clear, the rotational force begins at a higher value and reduces towards the predetermined value as the forming tool 302 rotates 1006, 1010 to form each of the legs 106 of the cotter pin. In other words, the rotational force is determined to have reached the predetermined value when it reduces to or below the predetermined value. When the forming tool 302 rotates to the start position, the rotational force would be 0 NM in the exemplary embodiment.

Figure 12:
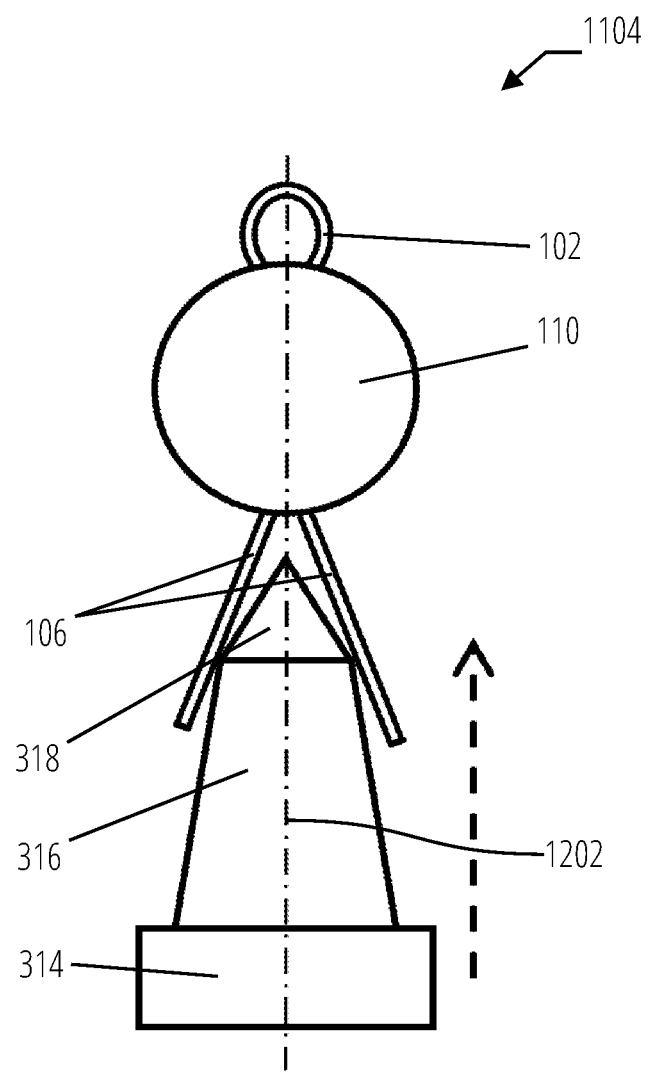
FIG. 12 is a plan view of a forming tool retracting to a closed position to separate legs of a cotter pin according to an exemplary embodiment.
Figure 13:
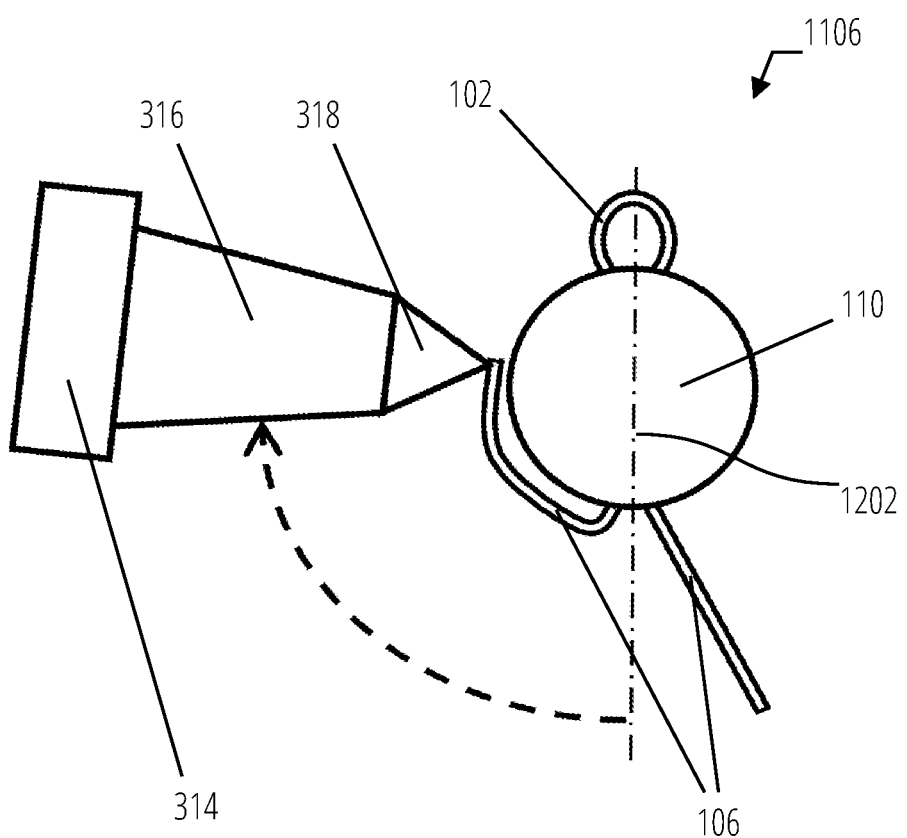
FIG. 13 is a plan view of the forming tool provided in FIG. 12 rotating in a clockwise direction to form a leg of the cotter pin.
Figure 14:
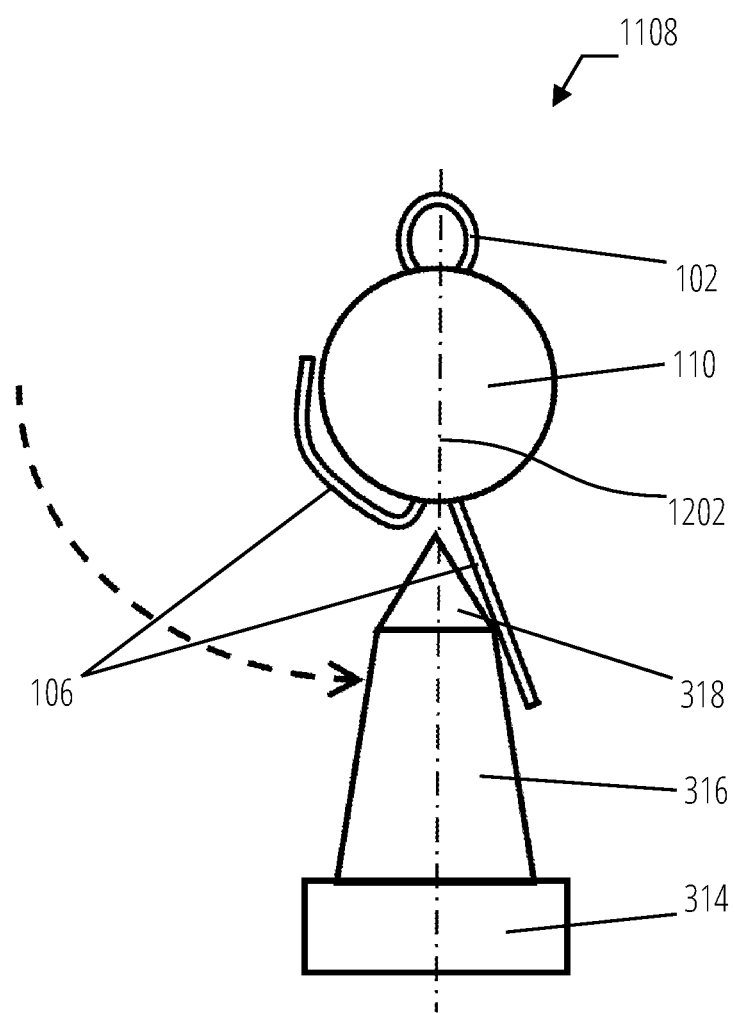
FIG. 14 is a plan view of the forming tool provided in FIG. 13 rotating in a counterclockwise direction to a start position.
Figure 15:
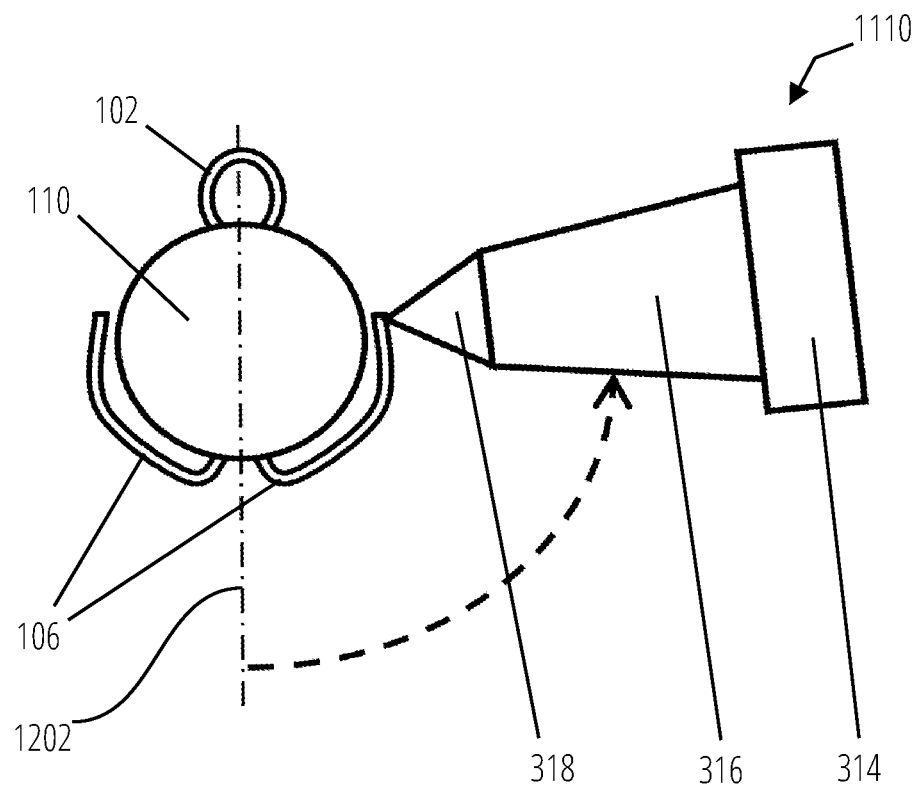
FIG. 15 is a plan view of the forming tool provided in FIG. 14 rotating in a counterclockwise direction to form a leg of the cotter pin.
Figure 16:
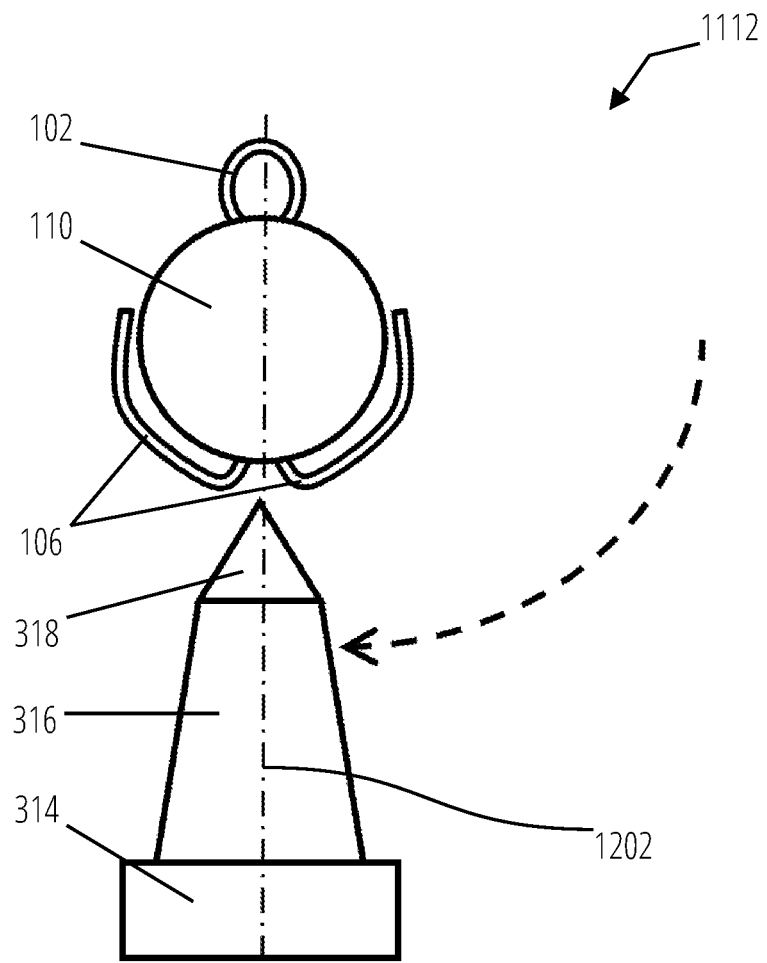
FIG. 16 is a plan view of the forming tool provided in FIG. 15 rotating in a clockwise direction to the start position.
Figure 17:
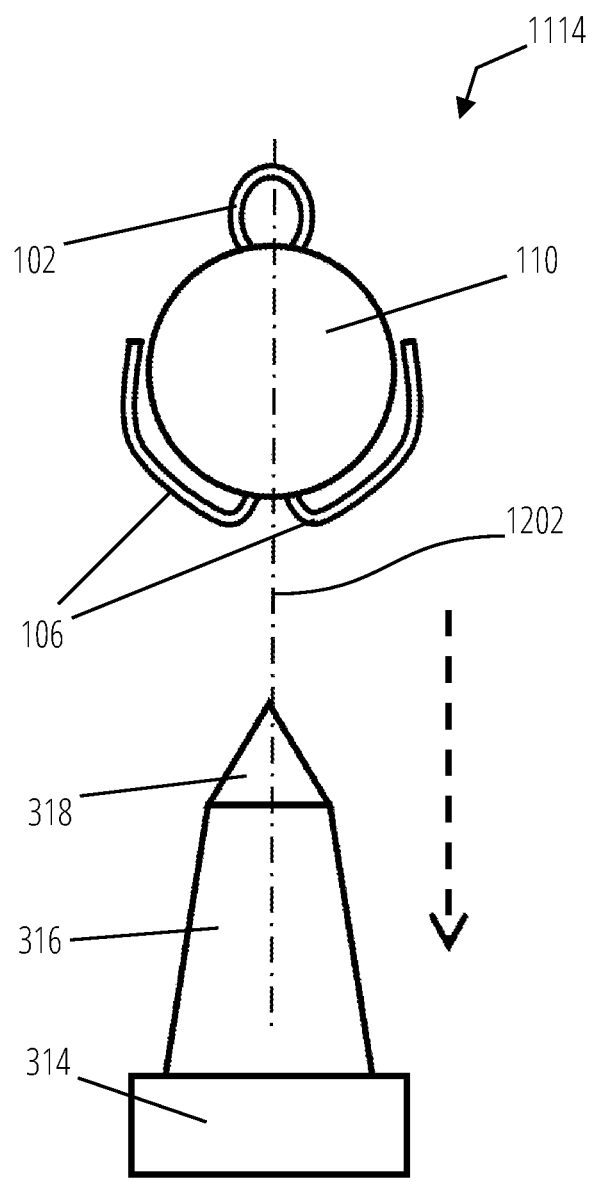
FIG. 17 is a plan view of the forming tool provided in FIG. 16 extending to an open position.

FIGS. 11-14 are plan views of the steps of method 1100 according to an exemplary embodiment. FIG. 12 is a plan view of the forming tool 302 separating the legs 106 of the cotter pin 102 by retracting 1004 the pneumatic cylinder to the closed position 600. More specifically, the blade portion 316 of the manipulator 314 of the forming tool 302 separating the legs 106 of the cotter pin 102 as the manipulator 314 retracts along a longitudinal axis 1202 parallel to the orientation of the preformed legs 106. FIG. 13 is a plan view of the forming tool 302 rotating 1006 in a clockwise direction to form one of the legs 106 of the cotter pin 102. FIG. 14 is a plan view of the forming tool 302 rotating 1008 in a counterclockwise direction to return to the start position. FIG. 15 is a plan view of the forming tool 302 rotating in a counterclockwise direction to form the other of the legs 106 of the cotter pin 102. FIG. 16 is a plan view of the forming tool 302 rotating in a clockwise direction to return to the start position. FIG. 17 is a plan view of the forming tool 302 extending to the open position 700. More specifically, the pneumatic cylinder of the forming tool 302 extending along the longitudinal axis 1202 to move the manipulator 314 to the open position 700.

The apparatus, systems, and methods described herein facilitate automatic formation of the legs of a cotter pin. More specifically, the apparatus, system, and methods described herein facilitate an efficient and effective assembly process of a component that includes a cotter pin. Also, the apparatus, systems, and methods automatically record and verify that a cotter pin has been properly installed.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. A system for forming a cotter pin, comprising:
an electric tool that includes a rotatable head and a switch; and
a forming tool coupled to the rotatable head that is configured to form legs of the cotter pin, wherein the forming tool comprises:
a frame at which the forming tool couples to the rotatable head;
a pneumatic cylinder disposed on the frame; and
a manipulator coupled to the pneumatic cylinder and configured to split the legs; and
wherein the switch is configured to initiate an automatic forming sequence to form the legs, and the electric tool is configured to measure a rotational force of the forming tool with respect to the electric tool.

2. The system of claim 1, wherein the forming sequence comprises:
retracting the pneumatic cylinder to a closed position to cause the manipulator to split the legs;
rotating the rotatable head in a clockwise direction until the rotational force reaches a predetermined value;
rotating the rotatable head in a counter clockwise direction until the manipulator reaches a start position wherein the manipulator is aligned longitudinally with a pre-formed position of the legs;
rotating the rotatable head in the counter clockwise direction until the rotational force reaches the predetermined value;
rotating the rotatable head in the clockwise direction until the manipulator reaches the start position; and
extending the pneumatic cylinder to an open position.

3. The system of claim 1, including a database configured to store operational data generated by the electric tool.

4. The system of claim 3, wherein the operational data includes:
a vehicle identification number; and
a confirmation of initiation of the forming sequence with respect to the vehicle identification number.

5. The system of claim 1, wherein the electric tool is a direct current (DC) electric tool.

* * * * *